Dec. 28, 1965   B. BLACK   3,225,522
GAS AND LIQUID CONTACT DEVICE
Filed Sept. 5, 1963   3 Sheets-Sheet 1
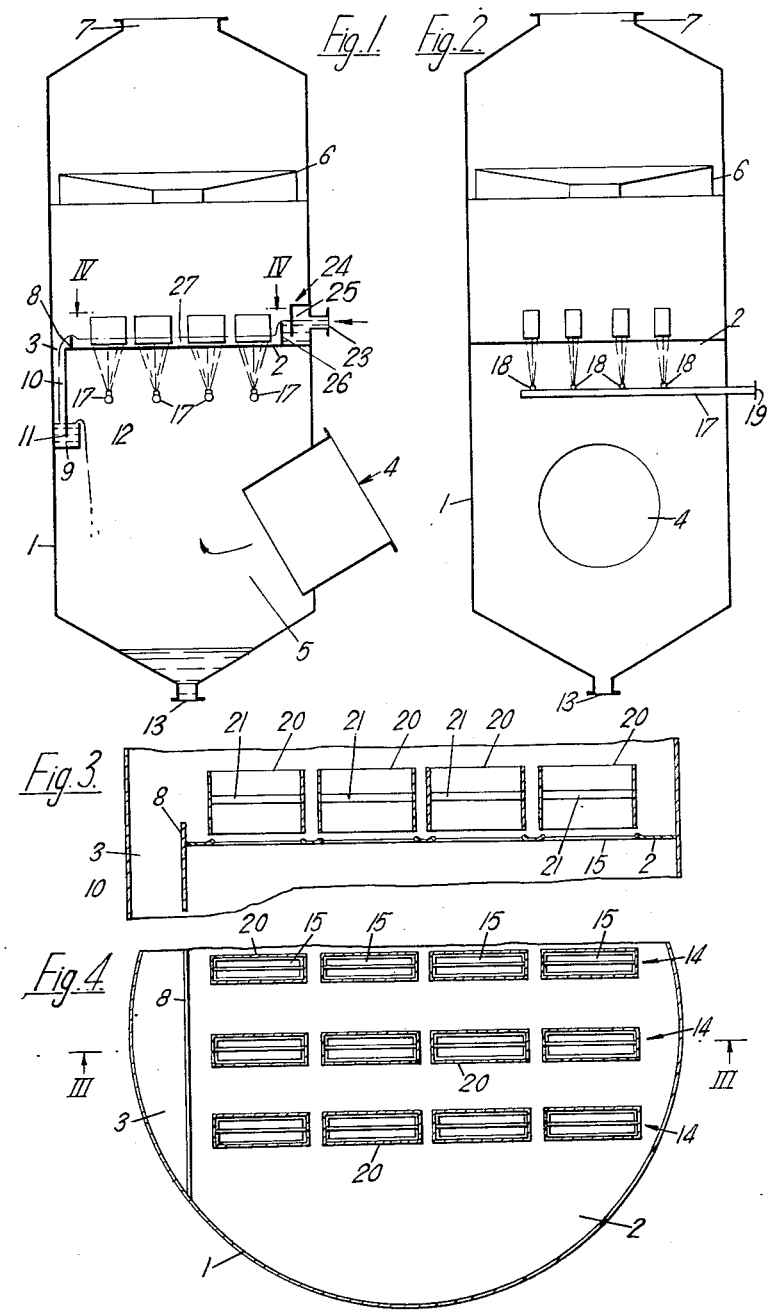

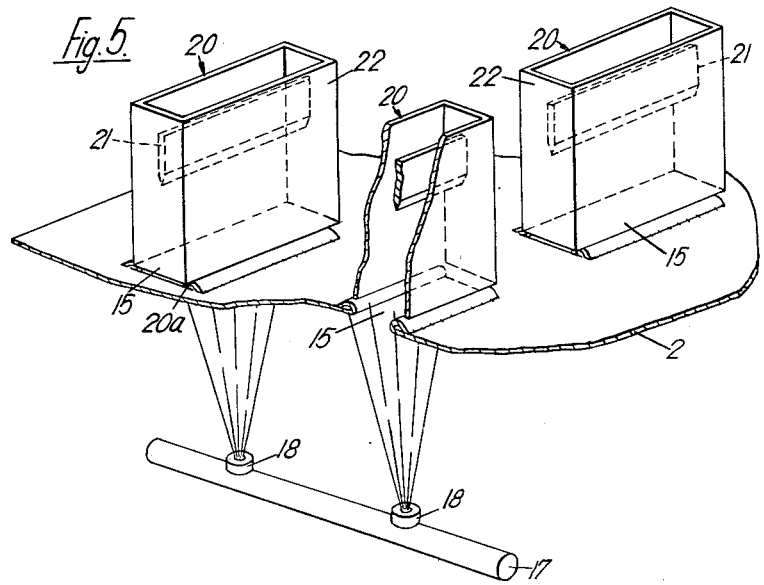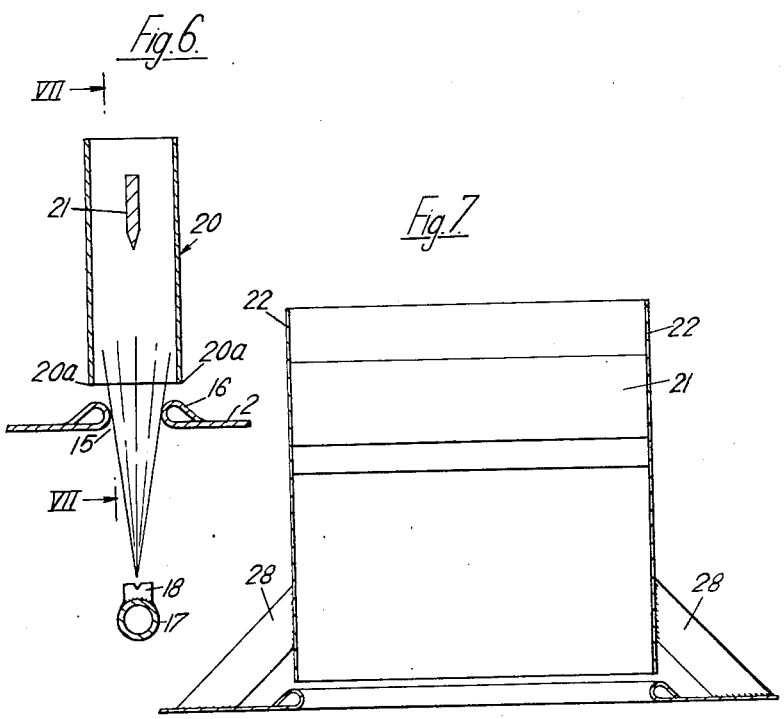

United States Patent Office 3,225,522
Patented Dec. 28, 1965

3,225,522
GAS AND LIQUID CONTACT DEVICE
Bernard Black, 31 Brockley Ave., Stanmore,
Middlesex, England
Filed Sept. 5, 1963, Ser. No. 306,771
Claims priority, application Great Britain, Sept. 10, 1962,
34,526/62
6 Claims. (Cl. 55—223)

This invention relates to gas and liquid contact devices and has for its main object an improved device in which the contact between gas and liquid is enhanced and provides for the convenient separation of foreign soluble undesired gases from a contaminated gas.

According to the present invention a gas and liquid contact device comprises, a vessel enclosing the combination of at least one horizontally disposed diaphragm plate having a plurality of slots therein, a corresponding plurality of chimneys having lower openings spaced from said diaphragm plate and severally embracing different ones of said slots, a plurality of liquid spray nozzles severally so disposed beneath said slots as to severally project sprays of liquid into different slots, means for injecting gas for contact with said liquid below said diaphragm plate, means for separating the gas delivered above said chimneys, means for supplying liquid under pressure to said liquid spray nozzles, and means for supplying liquid along and over said diaphragm plate so that the lower openings of said chimneys are maintained immersed in a pool of liquid supported by said diaphragm plate.

The means for supplying liquid to the nozzles may be in the form of an inlet opening in the vessel arranged to deliver liquid over and onto the diaphragm plate, and the diaphragm plate may have an upstanding rim or weir extending at least partially around or adjacent its periphery so as to retain on the diaphragm a shallow pool of liquid thereover, the lower openings of the chimneys being so spaced from the diaphragm as to be immersed in the shallow pool of liquid. The edges of the slots are preferably lipped, bulbous, or rounded in cross-section or otherwise curvilinear so to reduce eddies or turbulence in the gas entering the slots and also to reduce resistance to gas flow.

If desired, there may be more than one diaphragm plate disposed horizontally in the vessel one above the other. Furthermore, there may be one or more baffles disposed either above or below the diaphragm plate or plates to increase the contact between gas and liquid or to assist in the separation of the gas from entrained liquid droplets and provide a smooth entry for gas through the slots into the chimneys.

A radial vane liquid eliminator or baffle device may be disposed within the vessel above the chimneys to collect pure water which has been separated from the purified gas.

The device according to the present invention is useful for removing entrained particles from gases in industrial processes.

In order that the present invention may be more readily understood, certain examples thereof will now be described with reference to the accompanying drawings which show devices, particularly useful as gas washers.

In the drawings:

FIGURE 1 is a diagrammatic vertical section through a gas washing device according to the invention;

FIGURE 2 shows a similar view to that of FIGURE 1 but at an angle of 90° to that of FIGURE 1;

FIGURE 3 shows to an enlarged scale a diagrammatic part section (on the line III—III) of FIG. 4 showing the diaphragm plate and chimneys in the device of FIGURES 1 and 2;

FIGURE 4 shows also to an enlarged scale a section on the line IV—IV of FIG. 1;

FIGURE 5 shows a perspective diagrammatic view of part of the diaphragm plate and chimneys in more detail;

FIGURE 6 shows a diagrammatic section of a part of the diaphragm plate and associated parts shown in FIG. 5;

FIGURE 7 shows a sectional elevation of part of FIG. 6 on the line VII—VII of FIG. 6;

Figure 8:
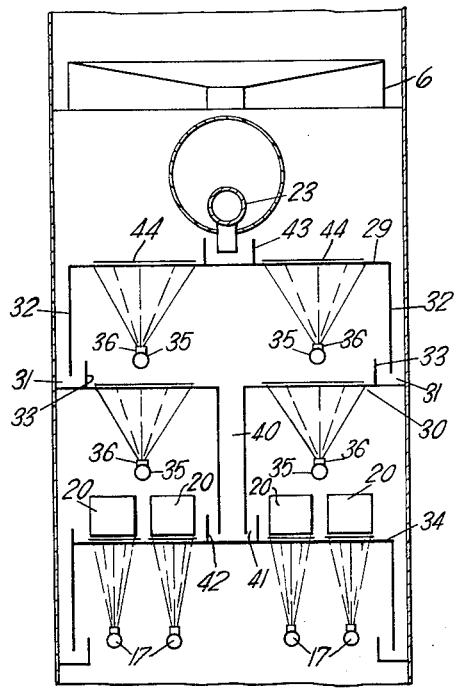
FIG. 8 shows a diagrammatic part section, similar to FIG. 1 of a first modification of the device of FIG. 1 using multiple separating stages.

Referring to the form shown in FIGS. 1 to 7 of the drawings, a tower-like vessel 1 is vertically disposed and is cylindrical but might be rectangular in cross-section. A diaphragm plate 2 is horizontally arranged across the vessel as shown and its periphery is in sealing engagement with the walls of the vessel except for a region as at 3 for a purpose to be later described. Dirty contaminated gas to be cleaned (e.g. containing unwanted soluble gases which it is desired to remove and/or particles which are also to be removed) enters the tower-like vessel 1 by way of an inlet 4. The dirty gas then proceeds up the inside of the vessel in the direction of the arrow 5. It then passes through the diaphragm plate 2 and during its pasage therethrough unwanted soluble gases and/or unwanted particles are removed by the liquid, which may be and is usually water, flowing therethrough as hereinafter described. After its passage through the diaphragm plate 2 the cleaned gas will contain entrained liquid droplets which are removed by passage past a radial vane water eliminator 6 which catches water droplets carried in the purified gas. The clean and dry gas then passes out through a gas outlet 7. Dirty water, i.e. the water containing the matter removed from the dirty gas, passes over an outflow rim or weir 8 on the plate 2 into the region 3. The outflowing dirty water is constrained to flow into a trap 9 by means of a depending skirt 10 which extends from the periphery of the plate 2 not in contact with the walls of hte vessel 1 downwardly into the trap 10 so that its bottom end 11 is always below the level of the water in the trap, thus constituting a water seal to prevent inflowing dirty gas from proceeding up the vessel otherwise than through the plate 2. The dirty water then flows out of the trap 9 over the weir 12 and down the vessel 1 to a dirty water outlet 13.

Referring now more particularly to FIGS. 3 to 7, the diaphragm plate 2 has a plurality of rows 14 of rectangular slots 15 which slots extend right through the plate. The edges of the slots are lipped or bulbous or rounded, as by being rolled over for otherwise curvilinear, as indicated at 16 (see FIG. 6), so as to allow smooth passage of gas therethrough and to reduce turbulence. Located below each row of slots is a header pipe 17 (FIGS. 5 and 6) which extends beneath and across each row. In each header pipe 17 are a series of nozzles 18 so arranged that several nozzles 18 are directly below each slot 15 and serve to direct atomised sprays of liquid, usually water, upwardly into the slot. Liquid is fed into the header pipes by an inlet such as 19 (see FIG. 2).

Above each slot 15 is located a rectangularly shaped chimney 20, the dimensions being such that the bottom edges 20a of the chimney overlap the edges of the slot above which it is positioned. Extending across the interior of each chimney and parallel to two opposite walls thereof is a knife edged baffle plate 21 having a sharp wedge shaped edge whose cross section is shown in FIG. 6 and which is attached at either end to the narrow side walls 22 (see FIG. 7) of the chimney as, for example, by welding.

Cleaning water has ingress to the vessel 1 by means of an inlet 23 (see FIG. 1). The inflowing water passes through a seal 24 constituted by a depending skirt 25 and a weir 26, the bottom end of the skirt 25 extending below the level of the top edge of the weir 26. The water flows over the edge of the weir 26, which extends around the diaphragm plate 2 to the boundaries of the trap 9, and then flows over the plate 2, the height of the weir 26 and the inlet velocity of the water being such as to maintain a shallow pool 27 of the water on the surface of the plate 2. The bottom edge 20a of the chimneys 20 are spaced from the plate 2 by an amount which allows these edges to project below the level of the water in the pool 27. The chimneys are maintained in the above spatial relationship to the plate 2 by means of stays 28 which are attached, as for example by welding, to the chimneys and to the plate 2 (as shown in FIG. 7). Liquid flows from the pool 27 into the slots to meet the uprising stream of gas together with liquid spray from the nozzles 18, the intimacy of contact between the gas and liquid being increased as the mixed stream of liquid spray and dirty gas passes upwardly through the chimneys 20. Besides the liquid flowing from the pool 27 into the slots 15, any excess also flows into the region 3 as previously described.

In FIG. 8 is shown a first modified arrangement in which the inflowing clean liquid has ingress to the vessel 1 through a header 23 from which it flows over perforated plates such as 29 and 30 (preferably having baffle 44 located directly over each perforation). The water flows across the plate 29 and then downwardly to plate 30 through a water seal 31 constituted by a depending skirt 32 and a weir 33. After leaving the plate 30, the cleaning liquid flows downwardly onto a diaphragm plate 34 of similar construction to that of the embodiment already described with reference to FIGS. 1 to 7. Below each perforated plate 29 and 30 are located header pipes 35 having spray nozzles 36 directing cleaning water onto the underside of each perforated plate 29 and 30. The remainder of the device of FIG. 8 is similar to that already described with reference to FIGS. 1 to 7. This arrangement of FIG. 8 is useful in certain applications such as where more than one cleaning stage is required to remove all the undesired matter as foreign soluble gases from the gas or where it is necessary to dissolve out from the gas other gases which are soluble with difficulty. In this case excess liquid flowing onto the top plate 29 overflows a weir 43 and flows through a passage formed by skirts 32 into a well 31 and thence over a weir 33 onto plate 30 and thence through a duct 40 into a well 41 bounded by a weir 42 on the lowest plate 34.

Figure 9:
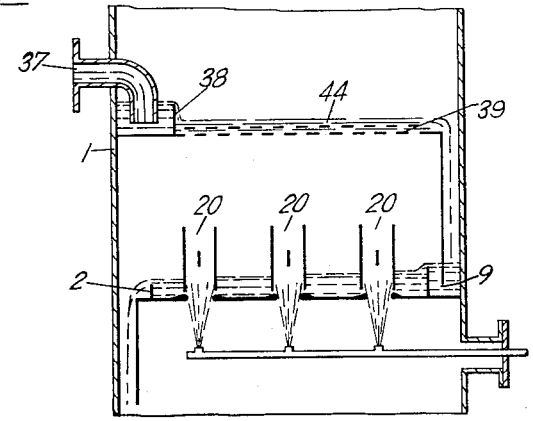
FIGURE 9 shows a diagrammatic part sectional view of another modification in which the cleaning water enters the chamber at a level above the chimneys.

In FIG. 9 is shown another modification, wherein the cleaning liquid enters the vessel 1 by way of an inlet 37 above chimneys 20 and thence over a weir 38 onto a perforated plate 39 having baffles 44 directly over each perforation. The liquid flows over the plate 39 and down into a liquid trap 9, similar to that already described with reference to FIGS. 1 to 7, on the diaphragm plate 2. Cleaned gas on exit from the chimneys 20 similar to those of FIG. 1 and containing entrained liquid droplets of pure water and maybe, some wholly wetted solid particles, then passes through the perforated plate 39 during which passage the entrained droplets and wetted solid particles are partially or completely separated and removed. In certain applications where the entrained droplets are not completely removed by the above process of FIG. 9, it may be necessary to allow the gas to pass through another liquid removal stage such as for example the radial vane liquid eliminator 6 of FIG. 1, previously described.

What I claim is:

1. A gas and liquid contact device comprising, a vessel enclosing the combination of horizontally disposed diaphragm plate means having a plurality of slots therein, a corresponding plurality of chimneys having lower openings spaced from said diaphragm plate means and severally embracing and overlapping different ones of said slots, a plurality of liquid spray jets severally so disposed beneath said slots as to severally project sprays of liquid into different slots, means for injecting gas for contact with said liquid below said diaphragm plate means, means for separating the gas from said liquid and being disposed above said chimneys, means for supplying liquid under pressure to said liquid spray jets, and means for supplying liquid over said diaphragm plate means so that the lower openings of said chimneys are maintained immersed in a pool of liquid supported by said diaphragm plate means, and means constituting an inlet for liquid mounted and adapted to deliver liquid over and onto said horizontally disposed diaphragm plate means, and wherein said diaphragm plate means has an upstanding peripheral outflow rim extending around a part of its periphery and adapted to retain on said diaphragm plate a shallow pool of liquid flowing thereover, and wherein the lower openings of said chimneys are so mounted and spaced from said diaphragm plate means as to be entirely immersed in said shallow pool of liquid so flowing over said diaphragm plate means.

2. A device according to claim 1, said slots of said diaphragm plate means having curvilinear lipped rounded edges.

3. A device according to claim 1, and a knife edged baffle plate mounted within each said chimney on the walls thereof and extending parallel to the walls of said chimney.

4. A device according to claim 1, and perforated plates mounted on the walls of said vessel above said diaphragm plate means and said chimneys, and a laminar baffle member mounted above the perforation in each said perforated plate.

5. A device according to claim 4, said perforated plates being mounted in two superposed separate levels above said diaphragm plate means.

6. A device according to claim 4, and means for supplying pure cleaning liquid from a source above said perforated plates and adapted to form a layer of liquid on top of said perforated plates.

References Cited by the Examiner

UNITED STATES PATENTS

| | | | |
|---|---|---|---|
| 1,658,533 | 2/1928 | Mart | 261—116 |
| 1,964,357 | 6/1934 | Ketterer | 261—116 |
| 2,226,127 | 12/1940 | Harmon | 55—237 X |
| 2,457,658 | 12/1948 | Graham | 61—113 |
| 2,523,126 | 9/1950 | Long | 261—114 X |
| 2,817,411 | 12/1957 | Coberly | 55—85 |

FOREIGN PATENTS 4,735 7/1908 Great Britain.

HARRY B. THORNTON, *Primary Examiner.*